United States Patent [19]

Janotik

[11] 4,153,868
[45] May 8, 1979

[54] UNIPOLAR DYNAMOELECTRIC MACHINE WITH VARIABLE RESISTANCE CONTROL

[75] Inventor: Adam M. Janotik, Grosse Ile, Mich.

[73] Assignee: Ford Motor Company, Dearborn, Mich.

[21] Appl. No.: 863,100

[22] Filed: Dec. 22, 1977

[51] Int. Cl.² ............................................ H02P 9/00
[52] U.S. Cl. .................................. 322/48; 310/219; 310/178
[58] Field of Search .................. 322/48; 310/219, 178; 318/253

[56] References Cited

U.S. PATENT DOCUMENTS

| | | | |
|---|---|---|---|
| 1,635,319 | 7/1927 | Gill et al. | 322/48 X |
| 3,211,936 | 10/1965 | Harvey | 310/219 X |
| 3,854,065 | 12/1974 | Rioux et al. | 310/219 |
| 3,989,968 | 11/1976 | Hatch | 310/219 |
| 4,071,795 | 1/1978 | Dobbing et al. | 310/219 |

Primary Examiner—Donovan F. Duggan
Attorney, Agent, or Firm—Robert W. Brown; Clifford L. Sadler

[57] ABSTRACT

A unipolar dynamoelectric machine with variable resistance control of machine current. The machine includes a stator, a rotor rotating within an opening in the stator, and a control member. The rotor also rotates about a portion of the control member. A first annular space exists between the control member and the rotor, and a second annular space exists between the rotor and stator. A field coil within the stator provides a magnetic field that may be used in machine control. A liquid metal is used to control the current level in the machine. A forcing device is used to control the amount of liquid metal contained within the first and second annular spaces. This controls machine resistance and current flow. Preferably, the amount of liquid metal in the first annular space is inversely proportional to rotor speed and that in the second annular space is directly proportional thereto.

11 Claims, 1 Drawing Figure

U.S. Patent
May 8, 1979
4,153,868
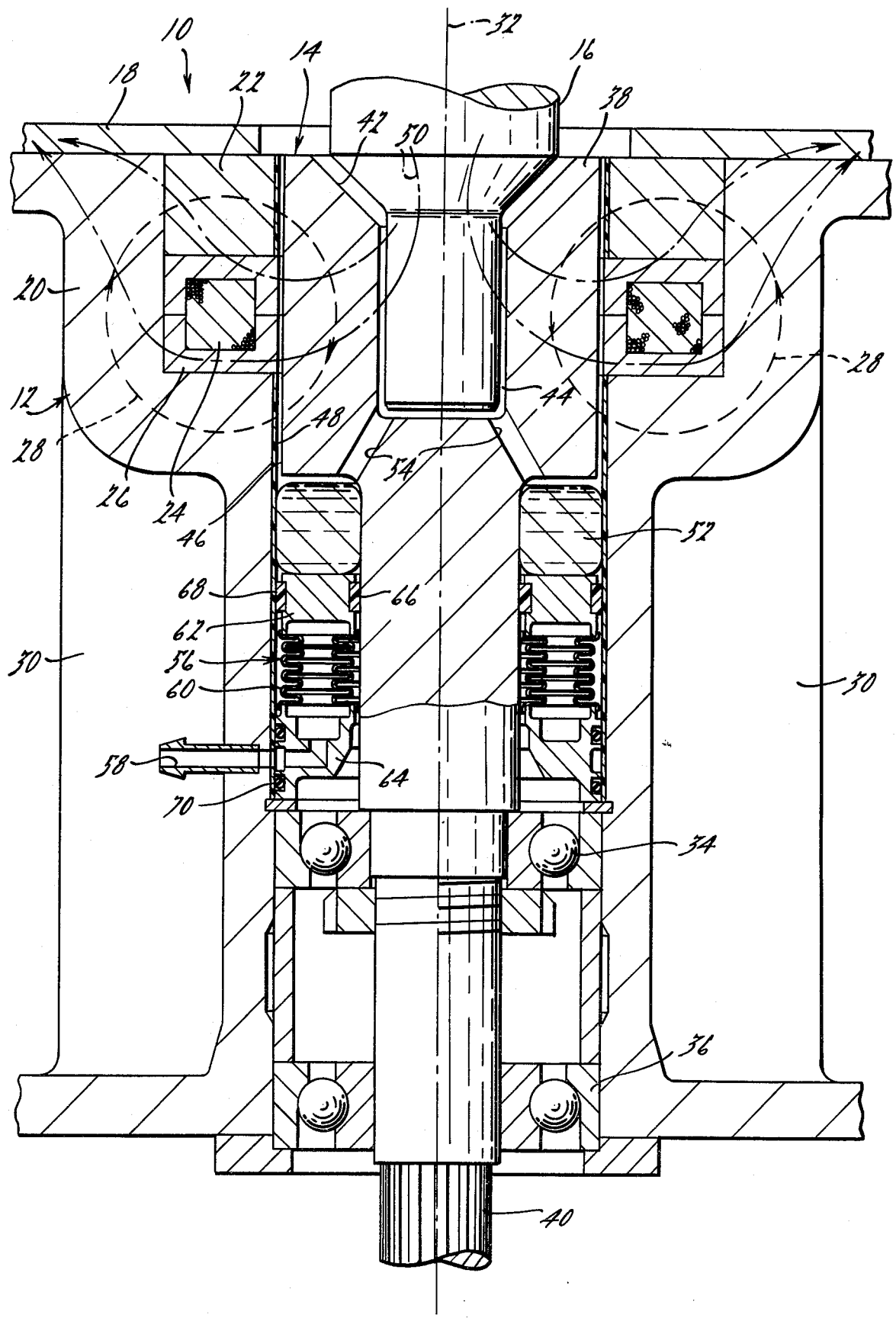

UNIPOLAR DYNAMOELECTRIC MACHINE WITH VARIABLE RESISTANCE CONTROL

BACKGROUND

This invention relates to a unipolar dynamoelectric machine with variable resistance control of machine current. Such machines sometimes are referred to as homopolar machines. The machine may be used as either a generator or a motor.

Unipolar or homopolar dynamoelectric machines are low-voltage, high-current devices that offer high power density per unit volume or unit weight at high efficiency.

DESCRIPTION OF THE PRIOR ART

Unipolar motors have been known for many years and are described in U.S. Pat. Nos. 3,185,877 to A. Sears; 3,453,467 to L. M. Harvey; 3,916,235 to E. Massar and 3,984,715 to D. Kullman et al. A unipolar or homopolar machine also is described in the publication; F. L. Zeisler, "A High Power Density Electric Machine Element", *IEFE Transactions on Power Apparatus and Systems,* Volume PAS-86, No. 7, pages 811–818, 1967. These patents and the publication describe unipolar machines having liquid metal contacts between a rotor and a stator, but none of these references teaches machine current control using the variable resistance principles described herein.

SUMMARY OF THE INVENTION

The unipolar dynamoelectric machine of the invention provides machine current control using a variable resistance within the machine. Preferably, the variable resistance is produced by changing the amount of liquid metal contact effected between a control member and the machine rotor as well as between the machine rotor and the stator.

Direct current motors, when used in an electric vehicle or other traction applications, should produce a torque that decreases hyperbolically as a function of the vehicle and motor speed. The unipolar machine of the invention, when used as a motor, produces a vortex in the aforementioned liquid metal contact which increases the motor's resistance to current flow as a function of rotor angular velocity. This feature improves the efficiency of the machine and greatly simplifies its control.

A unipolar dynamoelectric machine in accordance with the invention includes a stator comprising a housing and a field coil, the stator having an opening within it that defines an axis that is common to a field coil included in the stator. A rotor is journalled for rotation in the stator opening and about the axis, and a control member is mounted such that the rotor has a portion thereof that rotates about the control member. A first annular space is formed between the control member and the rotor, and a second annular space is formed between the rotor and the stator. The second annular space is located, with respect to the axis, radially outward of the first annular space. A liquid metal is stored within the machine in a cavity defined, at least in part, by the stator and the rotor.

Means are provided for forcing the liquid metal to enter the first and second annular spaces, thereby, to provide electrical contact between the control member and the rotor and between the rotor and the stator so that, upon the application of a voltage between the control member and the stator, a current is made to flow through the control member, the first annular space, the rotor, the second annular space and the stator, or vice versa, depending upon voltage polarity.

The amount of liquid metal in the first and second annular spaces determines the resistance to current flow in the machine. The forcing means thus controllably varies this resistance and hence varies current flow, a feature useful in control of the machine as a motor or as a generator. With the radial separation between the first and second annular spaces, rotation of the rotor generates a vortex in the liquid metal such that the volume in the first annular space is inversely proportional to rotor angular velocity and the volume in the second annular space is directly proportional to rotor angular velocity. As used herein, the term "inversely proportional" means that a dependent variable decreases as an independent variable increases and the term "directly proportional" means that a dependent variable increases as an independent variable increases. The proportionality factor need not be a constant but instead may be variable.

The invention may be better understood by reference to the detailed description which follows and to the drawings.

BRIEF DESCRIPTION OF THE DRAWING

The drawing is a sectional elevational view of a unipolar dynamoelectric machine with variable resistance control of machine current. The illustrated machine is particularly suitable for use as a motor and is so described. The various components within the drawing are of circular or annular construction.

DETAILED DESCRIPTION

With reference now to the drawing, there is shown a sectional view of a unipolar dynamoelectric machine generally designated by the numeral 10. The machine or motor 10, as it is described herein, includes a stator generally designated by the numeral 12 and a rotor generally designated by the numeral 14. Also provided is a control member 16 and an electrode or contact plate 18. Control member 16 and contact plate 18 may be directly coupled to the opposite polarity terminals of a low-voltage DC power supply, such as a heat engine or battery. The heat engine may be the type using liquid sodium at different temperatures in regions separated by a membrane to produce an EMF. The preferred battery is a sodium-sulfur battery, but others may be used to produce the low voltage required for the machine 10.

The stator 12 includes a first member 20 and a second member 22, both of these being in electrical contact with the contact plate 18 and together forming a housing. The stator also includes a field coil 24 that is surrounded by a conductive copper jacket 26, which may be formed by two identical annular channel-shaped elements as shown. A tube (not shown) for conducting a liquid coolant may be provided within the jacket 26 if necessary in a given machine application. Of course, other well known cooling techniques can be employed to improve machine efficiency and durability.

The field coil 25 is helically wound and produces the magnetic field indicated by the dashed lines 28. Thus, the direction of this magnetic field may be as indicated in the drawing or opposite in direction depending on the direction of current flow through the helical winding. Preferably, the first and second members 20 and 22 of the stator are made from ferromagnetic and electrically conductive materials. Iron having the smallest amount of carbon possible is desirable for these components. Component or member 22 of the stator is annular in shape and is used to provide a flux path for the magnetic flux produced by the field coil as well as to fill the space in the stator left empty prior to insertion of the field coil and its copper jacket into the stator during machine assembly. The member 20 has ribs 30, which preferably are formed as an integral part of the member 20.

The stator 12 has a central opening within it that is of circular cross-section throughout and which defines an axis 32. The rotor 14 is journalled for rotation about this axis by means of ball bearing assemblies 34 and 36. The rotor 14 includes an upper rotor portion 38 and an output shaft 40 that is threaded into rotor portion 38. Preferably, the rotor portion 38 is made from iron having a minimum carbon content and is ferromagnetic and electrically conductive.

The rotor portion 38 has a combined cylindrical and conical opening 42 in it in which the similarly shaped control member 16 is received. Rotor portion 38 rotates about control member 16, and these components are concentrically mounted with respect to axis 32. A first annular or cup-shaped space 44 is formed between the reduced-diameter portion of the control member 16 and the surface of rotor portion 38 which receives the control member and defines the opening 42. A second annular space 46 is located between the outer surface of rotor portion 38 and the surface of the stator opening. The stator has an insulating material 48 covering the surface area defining the stator opening, except on the surface of the copper jacket 26 located radially opposite the rotor portion 38. Current flow within the unipolar motor is indicated by the dot-dash lines 50 for the situation in which the annular spaces 44 and 46 contain a conductive material. It may be seen that this current flow is concentrated, due to the presence of the insulating material 48, in the copper jacket of the stator. This improves motor efficiency by tending to keep the direction of current flow perpendicular to the magnetic field lines 28. Of course, the torque produced by the motor is a function of the cross-product of these current and magnetic field vectors and is a maximum if they are mutually perpendicular.

A conductive liquid metal 52 is located within a cavity formed between the rotor portion 38 and the stator housing member 20. Mercury is the preferred liquid metal for this application, but liquid sodium, gallium, or gallium-indium alloys also may be used where the machine is utilized at temperatures sufficient to maintain these materials in a liquid state.

The second annular space 46 is located radially outward, with respect to the axis 32, of the first annular space 44, and the cavity in which the liquid metal 52 is located is separated from the first annular space 44 by the portion 38 of the rotor. Passages 54 interconnect the cavity in which the liquid metal is located with the first annular space 44.

A force producing means is provided in the form of an axially movable bellows assembly 56. The bellows assembly is of toroidal shape, is hollow, and has a tubular inlet 58 to permit air or other fluid pressure to be introduced into the assembly. The assembly walls include corrugated, preferably metal, walls 60 that are attached in sealing arrangement with upper and lower washer-shaped members 62 and 64. Member 62 is axially movable, is made from a metallic material, and has high-temperature plastic or other annular seals 66 and 68 to prevent the liquid metal 52 from passing the bellows assembly 56. O-ring seals 70 also are provided for this purpose.

When air or other fluid pressure is applied through inlet 58 to the bellows assembly interior, member 62 of the bellows assembly is forced to move with respect to the axis 32 (upwardly and against the force of gravity as viewed in the drawing), thereby, forcing the liquid metal 52 into the first and second annular spaces 44 and 46, respectively. The liquid metal 52 enters the first annular space 44 through the passages 54. The force applied to, and resultant movement of, the member 62 determine the amount of liquid metal entering the first and second annular spaces. With the liquid metal 52 located as shown in the drawing, there is infinite resistance between the control member 16 and the stator 12. However, when the liquid metal enters the first and second annular spaces such that liquid metal in the first annular space contacts the control member 16 and the rotor portion 38 and such that liquid metal in the second annular space contacts the rotor portion 38 and the stator 12, then electrical current can flow from the control member 16 to the stator or vice versa. With the insulating material 48 located as shown in the drawing, the liquid metal in the second annular space 46 must flow axially upwardly as viewed in the drawing until it actually contacts the coppper jacket 26.

The greater the amount of liquid metal in the first and second annular spaces 44 and 46, the lower is the resistance between the control member 16 and the contact plate 18. The supply voltage for motor 10 is applied between control member 16 and contact plate 18 and may have a magnitude of about one and one-half volts. The control member 16 preferably is made from a substantially conductive material, that is, while it is not a perfect conductor, it will have a resistivity not greatly above that of the outer conductive materials in the machine 10. Of course, the amount of liquid metal in the annular spaces 44 and 46 determines the motor current because the resistance to current flow varies as a function of the amount of surface area of the control member, rotor and stator contacted by the liquid metal.

As the rotor 14 rotates, there is a tendency for the liquid metal in the first annular space 44 to decrease in volume and for the amount of liquid metal in the second annular space 46 to increase in volume. In other words, the volume of liquid metal in the annular space 44 is inversely proportional to rotor angular velocity and the amount in the annular space 46 is directly proportional to rotor angular velocity. The results from centrifugal force acting on the liquid metal, there is a vortex-generating effect that occurs because the second annular space 46 is located radially outward from the first annular space 44. This vortex effect is desirable in that, with respect to the application of the motor to electric vehicles, it is desirable to reduce the motor current flow as a hyperbolic function of the motor speed.

Since, due to the aforementioned vortex effect, the height of the liquid metal in the space 44 and its height in the space 46 are hyperbolic functions of the rotor speed and since the resistance to current flow thereby is a hyperbolic function of rotor speed, the motor design described herein is particularly suitable for vehicle traction applications.

The insulating material 48 preferably is a non-conductive ceramic or high-temperature polyimide material. Also, with respect to the copper jacket 26, nickel coating and rhodium flash are provided thereon in the portion thereof located in the second annular space 46 to minimize the resistance to current flow in this location. With respect to the corrugated metal portion of the bellows assembly 56, it is preferred that this be formed from a nickel or nickel alloy. The iron from which the bulk of the stator 12 is formed may be armco iron. This is a very low carbon iron.

When the motor 10 is used in vehicles or other applications requiring speed control, the air or fluid pressure applied to the bellows assembly 56 through the inlet 58 may be controlled by an accelerator pedal connected to an air bellows or the like and may be operated by a vehicle or machine operator.

Based upon the foregoing description of the invention, what is claimed is:

1. A unipolar dynamoelectric machine with variable resistance control of machine current, said machine comprising:
   a stator comprising a housing and a field coil said stator having an opening within it defining an axis and said field coil being helically wound and concentrically positioned with respect to said axis, said housing being made from a ferromagnetic and electrically conductive material in its portion near said field coil;
   a rotor journalled for rotation within said stator opening and about said axis, said rotor including a ferromagnetic and electrically conductive portion;
   a control member made from a material having some electrical resistance, said rotor portion rotating about said control member when said rotor rotates about said axis, said rotor portion being located between said control member and said housing portion, a first annular space being formed between said control member and said rotor portion, a second annular space being formed between said housing portion and said rotor portion, said first and second annular spaces being concentric about said axis, said second annular space being located radially outward of said first annular space;
   a liquid metal stored within said machine in a cavity therein defined at least in part by said stator and said rotor, and
   means for forcing said liquid metal to enter said first and second annular spaces, thereby, to provide electrical contact between said control member and said rotor portion and between said rotor portion and said stator.

2. A dynamoelectric machine as in claim 1, wherein the amount of liquid metal within said annular spaces is controllably variable by said forcing means.

3. A dynamoelectric machine as in claim 1, wherein said forcing means includes an axially movable member in engagement with said liquid metal, axial movement of said axially movable member causing axial flow of said liquid metal into said annular spaces.

4. A dynamoelectric machine as in claim 3, wherein said axial flow of said liquid metal is in a substantially vertical direction and against the force of gravity.

5. A dynamoelectric machine as in claim 2, wherein the amount of liquid metal in said first annular space is inversely proportional to the angular velocity of said rotor and wherein the amount of liquid metal in said second annular space is directly proportional to said angular velocity of said rotor.

6. A dynamoelectric machine as in claim 5, wherein said cavity in which said liquid metal is stored is located between said housing and said rotor, wherein one of said annular spaces is separated from said cavity by said rotor, and wherein said rotor includes a passage interconnecting said cavity and said separated annular space.

7. A dynamoelectric machine as in claim 5, wherein said forcing means comprises an axially expandable bellows of annular configuration.

8. A dynamoelectric machine as in claim 6, wherein said forcing means comprises an axially expandable bellows of annular configuration.

9. A dynamoelectric machine as in claim 7, wherein said stator includes a copper jacket, said copper jacket surrounding said field coil.

10. A dynamoelectric machine as in claim 9, wherein said stator includes an insulating material on said housing said insulating material covering the surface defining said opening except in the region thereof wherein said field coil and surrounding copper jacket are located, a voltage applied between said housing and said control member causing a current to flow through said control member, through said liquid metal in said first annular space, through said rotor portion, through said liquid metal in said second annular space and into said copper jacket or vice versa, depending upon the polarity of said voltage.

11. A dynamoelectric machine as in claim 10, wherein said cavity in which said liquid metal is stored is located between said housing and said rotor, wherein one of said annular spaces is separated from said cavity by said rotor, and wherein said rotor includes a passage interconnecting said cavity with said separated annular space.

* * * * *